(12) United States Patent
Yamashina

(10) Patent No.: US 12,168,376 B2
(45) Date of Patent: Dec. 17, 2024

(54) WORK VEHICLE

(71) Applicant: TADANO LTD., Kagawa (JP)

(72) Inventor: Takahiro Yamashina, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 18/440,114

(22) Filed: Feb. 13, 2024

(65) Prior Publication Data

US 2024/0270039 A1 Aug. 15, 2024

(30) Foreign Application Priority Data

Feb. 15, 2023 (JP) ................. 2023-021790

(51) Int. Cl.
*B60G 17/015* (2006.01)
(52) U.S. Cl.
CPC .... *B60G 17/0152* (2013.01); *B60G 2202/152* (2013.01)
(58) Field of Classification Search
CPC ............ B60G 17/0152; B60G 17/015
See application file for complete search history.

(56) References Cited

U.S. PATENT DOCUMENTS 7,029,014 B2 * 4/2006 Hamm ............... B60G 21/0556
280/5.509

FOREIGN PATENT DOCUMENTS

JP          2015-024739 A     2/2015
WO   WO-2023175944 A1 *  9/2023

* cited by examiner

*Primary Examiner* — Faye M Fleming
(74) *Attorney, Agent, or Firm* — Paratus Law Group, PLLC

(57) ABSTRACT

In a truck crane, in a state where an air suspension is in an exhaust state and a locking member is not in a locked position, a control unit restricts a movement of a front outrigger and a rear outrigger to a ground contact position, and in a state where the air suspension is in the exhaust state and the locking member is in the locked position, the control unit allows the movement of the front outrigger and the rear outrigger to the ground contact position.

6 Claims, 12 Drawing Sheets

WORK VEHICLE

CROSS REFERENCE TO RELATED APPLICATIONS

This application is entitled to or claims the benefit of Japanese Patent Application No. 2023-021790, filed on Feb. 15, 2023, the disclosure of which including the specification, drawings and abstract is incorporated herein by reference in its entirety.

TECHNICAL FIELD

The present invention relates to a work vehicle.

BACKGROUND ART

Conventionally, as disclosed in Patent Literature 1, a work vehicle is known that includes an outrigger device that stretches from the vehicle body and supports the vehicle body during work, and a suspension device that suspends the shaft so that the shaft can swing freely in the vertical direction.

The suspension device of such a work vehicle has an air suspension that can be switched between an exhaust state in which air inside is exhausted and the air suspension retracts, and a leveling state in which air is supplied inside and the air suspension extends longer than the exhaust state, and in such a case, when the outrigger device is jacked up with the air suspension in the exhaust state, the retracted air suspension extends rapidly due to the weight of the shaft, and the like supported by the air suspension, and the air suspension may be damaged or deteriorated.

CITATION LIST

Patent Literature

Patent Literature 1: Japanese Patent Application Publication No. 2015-24739

SUMMARY OF THE INVENTION

Problems to be Solved by the Invention

Therefore, it is desirable to reliably suppress damage or deterioration of the air suspension regardless of the condition of the air suspension.

An object of the present invention is to provide a work vehicle that can reliably suppress damage or deterioration of the air suspension.

Solution to Problem

One aspect of the work vehicle according to the present invention includes: a shaft on which a wheel is rotatably mounted; a suspension device that has a shaft support unit that supports the shaft, and an air suspension that is interposed between the shaft support unit and a vehicle body and is switchable between an exhaust state in which air inside is exhausted and the air suspension retracts, and a leveling state in which air is supplied inside and the air suspension extends longer than the exhaust state; a locking member that is movable between a locked position that restricts an extension action of the air suspension in the exhaust state and an unlocked position that allows the extension action of the air suspension in the exhaust state; an outrigger device that is movable between a ground contact position where the outrigger device contacts the ground and supports the vehicle body and a housing position where the outrigger device is housed in the vehicle body; and a control unit that includes at least one circuit that controls actions of at least the air suspension, the locking member, and the outrigger device, wherein the control unit restricts a movement of the outrigger device to a ground contact position in a state where the air suspension is in the exhaust state and the locking member is not in the locked position, and allows a movement of the outrigger device to the ground contact position in a state where the air suspension is in the exhaust state and the locking member is in the locked position.

Another aspect of the work vehicle according to the present invention further includes a sensor that detects the locked position and the unlocked position of the locking member.

Further, still another aspect of the work vehicle according to the present invention includes: a plurality of the wheels; a plurality of the suspension device provided corresponding to the plurality of the wheels; and a plurality of the locking member provided corresponding to the plurality of the wheels, wherein the control unit allows a movement of the outrigger device to the ground contact position in a state where all the locking members are in the locked position.

Further, in still another aspect of the work vehicle according to the present invention, the control unit restricts a switch action of the air suspension from the exhaust state to the leveling state in a state where the air suspension is in the exhaust state and the locking member is in the locked position.

Further, still another aspect of the work vehicle according to the present invention includes: a plurality of the wheels; a plurality of the suspension device provided corresponding to the plurality of the wheels; and a plurality of the locking member provided corresponding to the plurality of the wheels, wherein the control unit restricts a switch action of the air suspension from the exhaust state to the leveling state in a state where at least one of the locking member is in the locked position.

Further, another aspect of the work vehicle according to the present invention includes: a locking cylinder that extends and retracts to move the locking member between the locked position and the unlocked position; and a sensor that detects an expansion and a retraction of the locking cylinder, wherein the locking member moves to a locked position on one hand when the locking cylinder extends or retracted, and moves to an unlocked position on an other hand when the locking cylinder extends or retracted, and the control unit determines that a movement of the locking member to the locked position is detected when the sensor detects one of an expansion and a retraction of the locking cylinder, and determines that a movement of the locking member to the unlocked position is detected when the sensor detects an other of an expansion or a retraction of the locking cylinder.

Effects of the Invention

According to the present invention, in a case where the outrigger device moves to the ground contact position when the air suspension is in the exhaust state, the air suspension can be suppressed from extending at once and becoming damaged or deteriorated.

DESCRIPTION OF EMBODIMENTS

Next, embodiments for carrying out the present invention will be described with reference to the accompanying drawings.

[Truck Crane]

Figure 1:
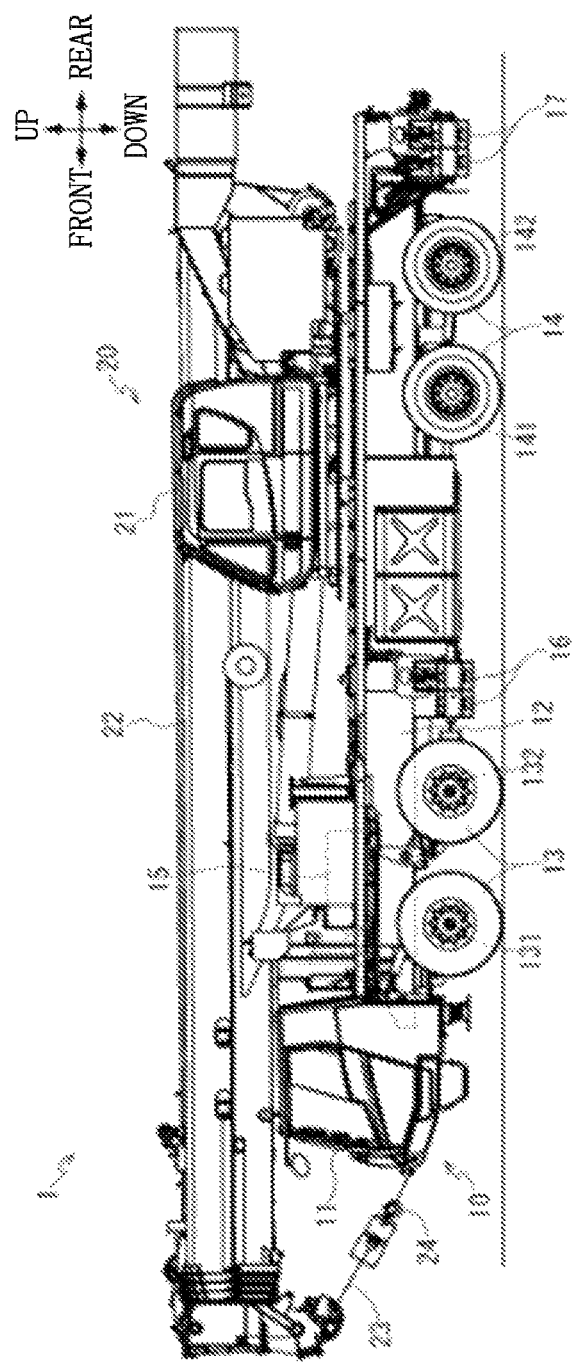
FIG. 1 is a side view illustrating a truck crane.

A truck crane 1 illustrated in FIG. 1 is an embodiment of a work vehicle according to the present invention. In the present embodiment, description will be given using the truck crane 1, and other work vehicles can also be applied, such as a loaded truck crane equipped with a crane device for loading and unloading and a cargo bed for loading cargo, an elevating work vehicle with elevating equipment mounted on the vehicle, and a self-propelled crane that can drive itself.

In the following description, the longitudinal direction of the truck crane 1 is defined as the front-rear direction, and the side where a driver cab 11 is arranged is defined as the front side. In addition, the right hand side of the truck crane 1 when facing the front side is defined as the right side, and the left hand side is defined as the left side.

The truck crane 1 is a general-purpose truck 10 with a crane device 20 mounted thereon. However, in the truck crane 1, it is also possible to use a specially constructed truck instead of the general-purpose truck 10. The truck 10 includes a driver cab 11, a frame 12, front wheels 13, rear wheels 14, an engine 15, front outriggers 16, and rear outriggers 17.

The driver cab 11 is located at the front end of the truck 10. The frame 12 projects rearward from the driver cab 11 and constitutes the vehicle body of the truck 10. A pair of frames 12 are provided on the left and right.

The frame 12 is provided with a plurality of the front wheels 13 and the rear wheels 14. Specifically, the frame 12 supports a shaft 131, a shaft 132, a shaft 141, and a shaft 142, and the front wheels 13 are rotatably attached to the left and right ends of the shaft 131 and the left and right ends of the shaft 132, and the rear wheels 14 are rotatably attached to the left and right ends of the shaft 141 and the right and left ends of the shaft 142. The front wheels 13 and the rear wheels 14 are examples of wheels.

The shafts 131 and 132 are supported at the front of the frame 12, and the shaft 131 is located further forward than the shaft 132. The shafts 141 and 142 are supported at the rear of frame 12, and the shaft 141 is located further forward than the shaft 142.

The engine 15 is supported at the front of the frame 12. The truck 10 is configured to be able to travel by transmitting a driving force from the engine 15 to the plurality of the front wheels 13 and the rear wheels 14.

The frame 12 is provided with the front outriggers 16 and the rear outriggers 17. In the front-rear direction, the front outriggers 16 is located between the front wheels 13 and the rear wheels 14, and the rear outriggers 17 is located behind the rear wheels 14. The front outriggers 16 and the rear outriggers 17 are examples of outrigger devices.

The front outriggers 16 and the rear outriggers 17 are movable between a ground contact position where they contact the ground and support the vehicle body of the truck 10, and a housing position where they are housed in the vehicle body of the truck 10. For example, when the truck crane 1 is working, the front outriggers 16 and the rear outriggers 17 stretch outward to the left and right and extend in the vertical direction to contact the ground and support the vehicle body of the truck 10.

The crane device 20 is rotatably supported by the frame 12. The crane device 20 includes a cabin 21 and a boom 22. The boom 22 is configured to be rotatable together with the cabin 21. The boom 22 is configured to be extendable and retractable, and to be able to raise and lower. A wire rope 23 is spanned over the boom 22, and a hook 24 is attached to the tip of the wire rope 23.

[Suspension Device]

Figure 2:
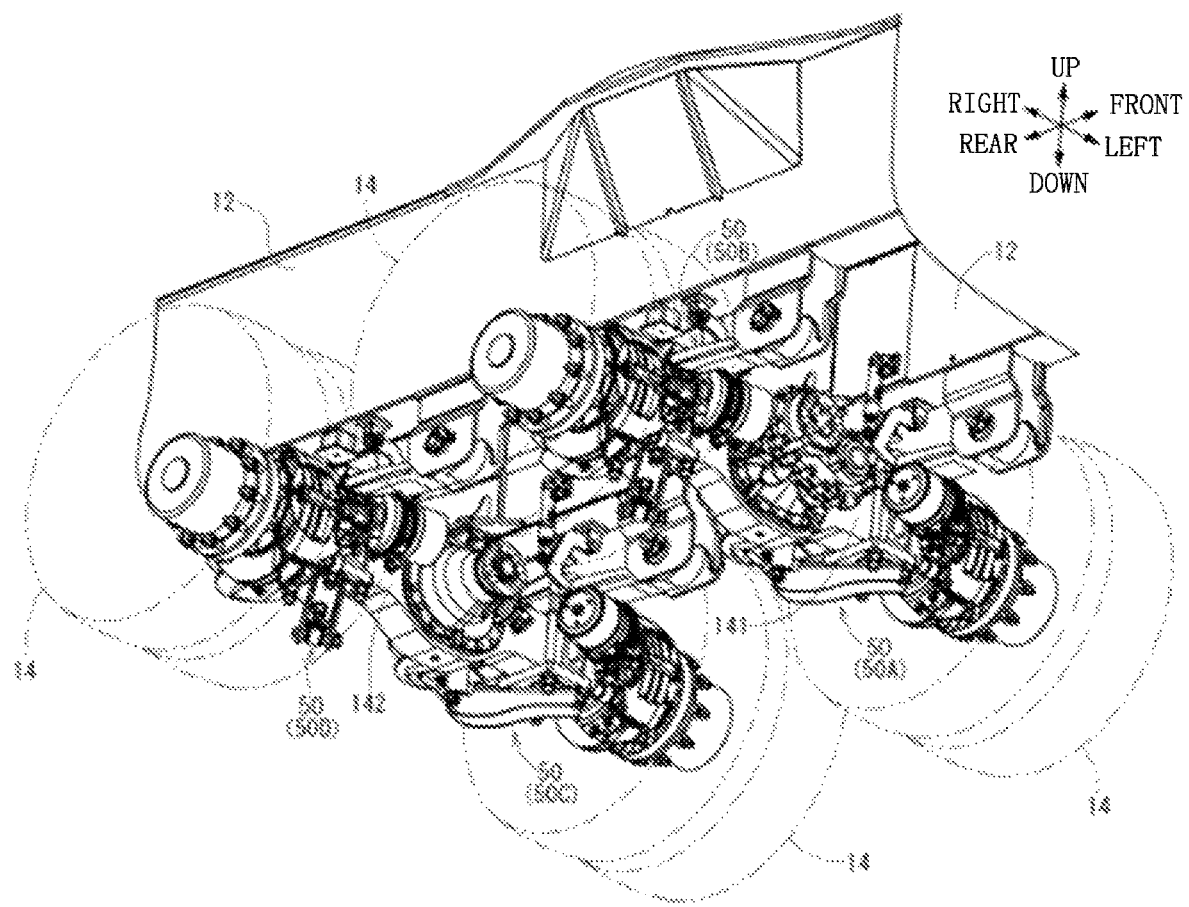
FIG. 2 is a perspective view illustrating a rear wheel shaft supported by a frame via a suspension device.

As illustrated in FIG. 2, the truck 10 includes the suspension device 50, and shafts 141 and 142 to which the rear wheels 14 are attached are supported by the frame 12 via the suspension device 50. The suspension device 50 is provided at the left and right ends of the shaft 141 and at the left and right ends of the shaft 142. That is, the suspension devices 50 are provided at four locations corresponding to the plurality of rear wheels 14 provided on the left and right sides of the shaft 141 and the left and right sides of the shaft 142.

In the following description, the suspension device 50 located at the left end of the shaft 141 is referred to as the suspension device 50A, the suspension device 50 located at the right end of the shaft 141 is referred to as the suspension device 50B, the suspension device 50 located at the left end of the shaft 142 is referred to as the suspension device 50C, and the suspension device 50 located at the right end of the shaft 142 is referred to as the suspension device 50D, as necessary. The suspension devices 50A, 50B, 50C, and 50D have similar configurations except that the suspension devices 50A, 50C and the suspension devices 50B, 50D are configured to be approximately left-right symmetrical.

Figure 3:
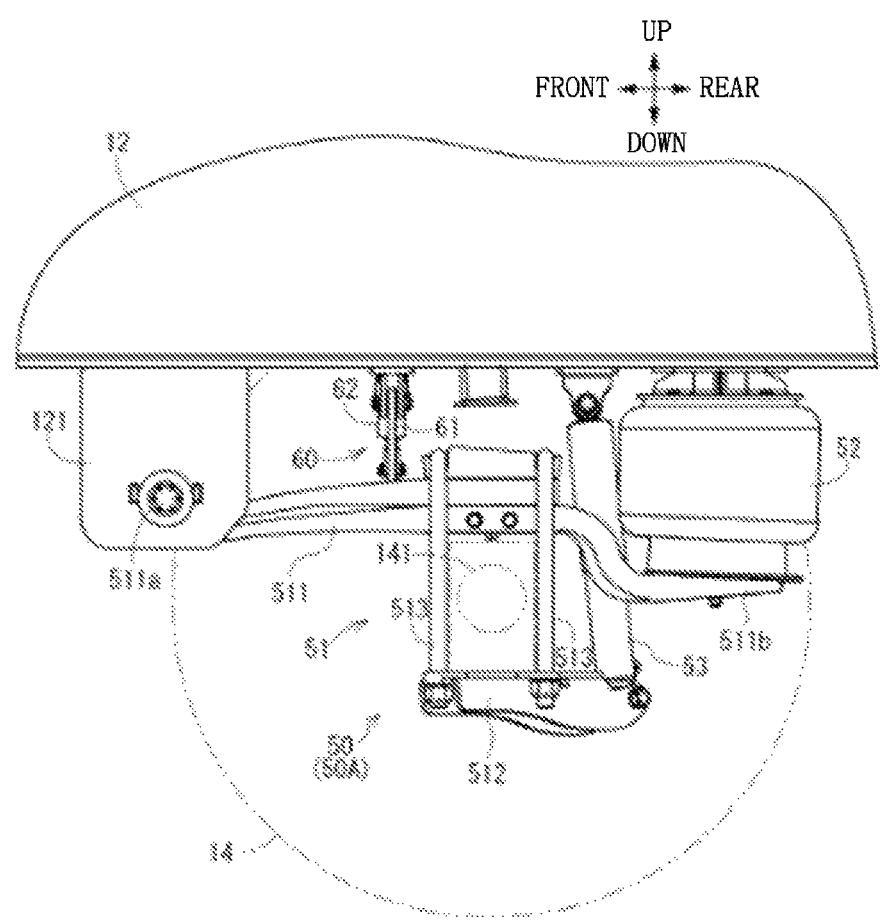
FIG. 3 is a side view illustrating the suspension device in which the air suspension is in a leveling state.
Figure 4A:
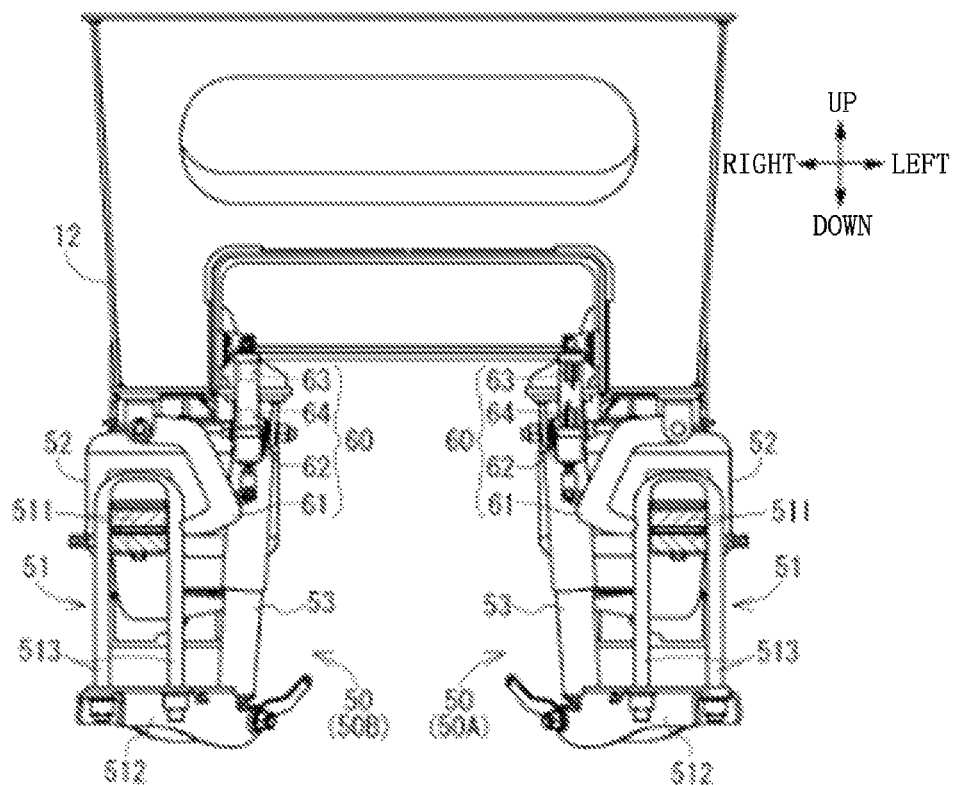
FIG. 4A is a front sectional view illustrating the suspension device in which the air suspension is in the leveling state.
Figure 4B:
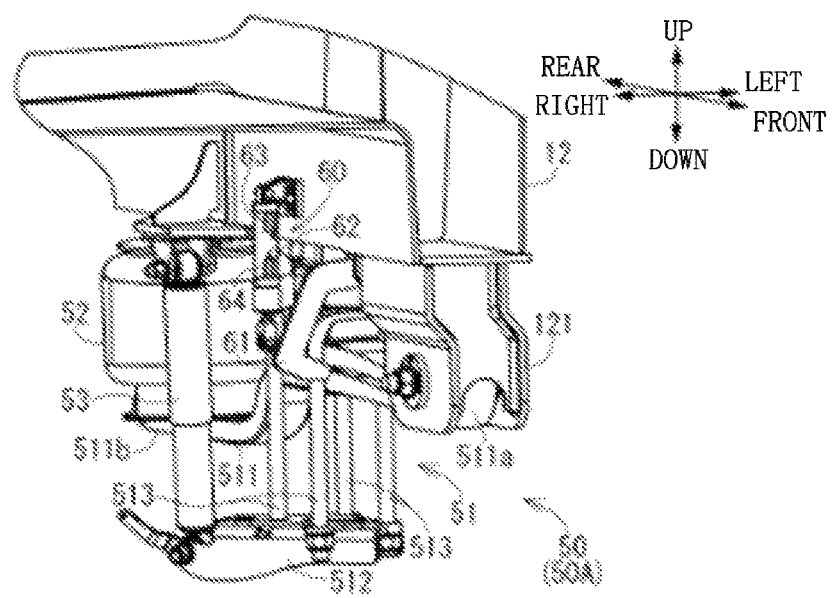
FIG. 4B is a perspective view illustrating the suspension device in which the air suspension is in the leveling state.

As illustrated in FIGS. 3, 4A, and 4B, the suspension device 50 includes a shaft support unit 51, an air suspension 52, and a shock absorber 53.

The shaft support unit 51 is a portion that supports the shafts 141 and 142, and includes a leaf spring 511, a support plate 512, and a bracket 513. The leaf spring 511 is a plate-shaped spring member protruding in the front-rear direction, and a rear end 511a of the leaf spring 511 is rotatably supported by a stay 121 of the frame 12. The support plate 512 is located below the leaf spring 511 and is connected to the leaf spring 511 by the bracket 513. The shafts 141 and 142 are supported by the shaft support unit 51 between the support plate 512 and the leaf spring 511.

Figure 5:
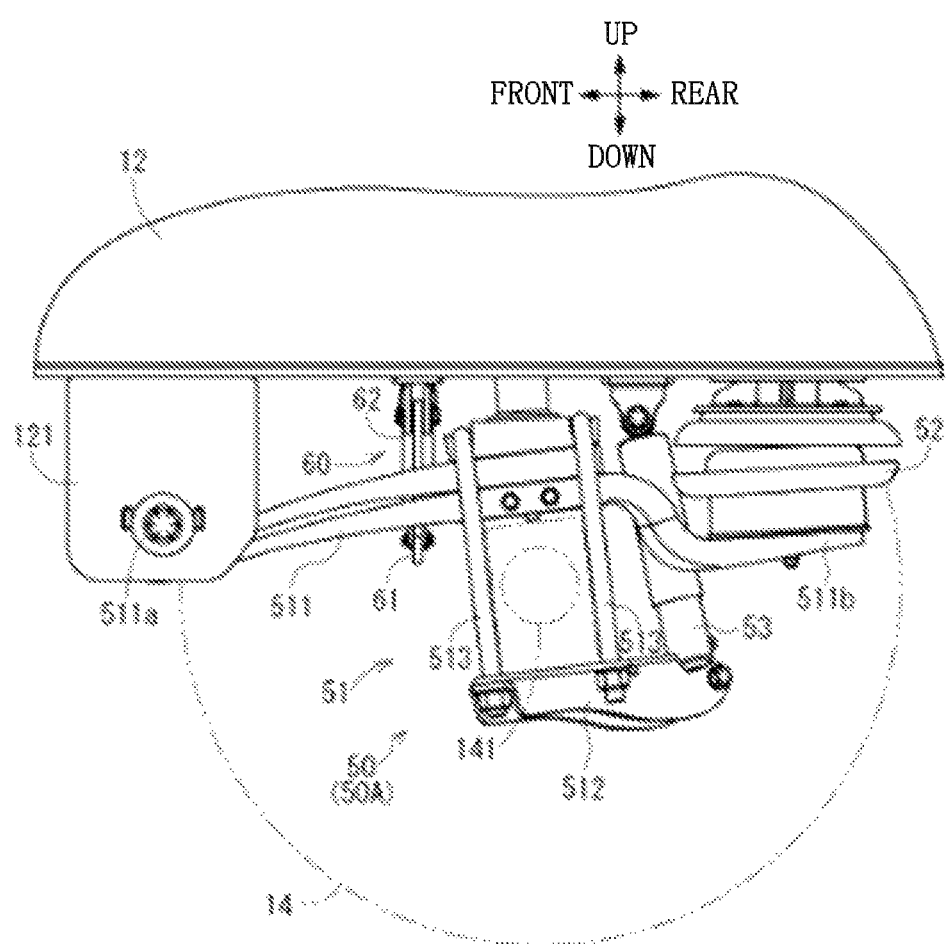
FIG. 5 is a side view illustrating the suspension device in which the air suspension is in an exhaust state.
Figure 6A:
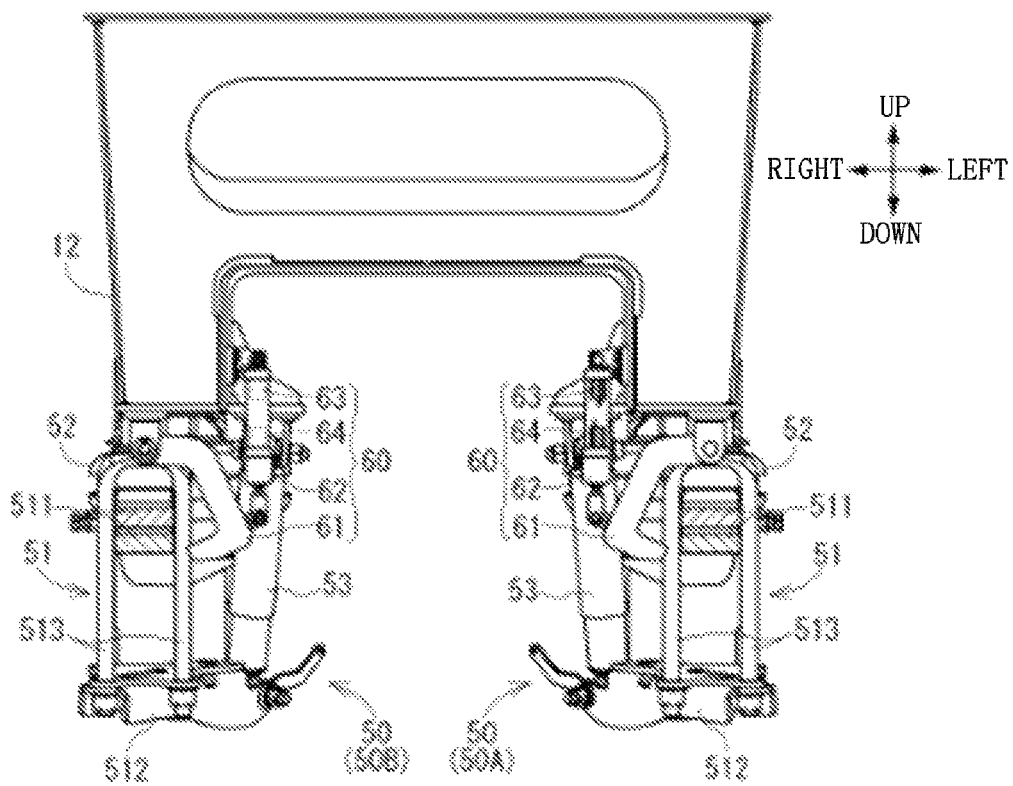
FIG. 6A is a front sectional view illustrating the suspension device in which the air suspension is in the exhaust state and the locking member is in the unlocked position.
Figure 6B:
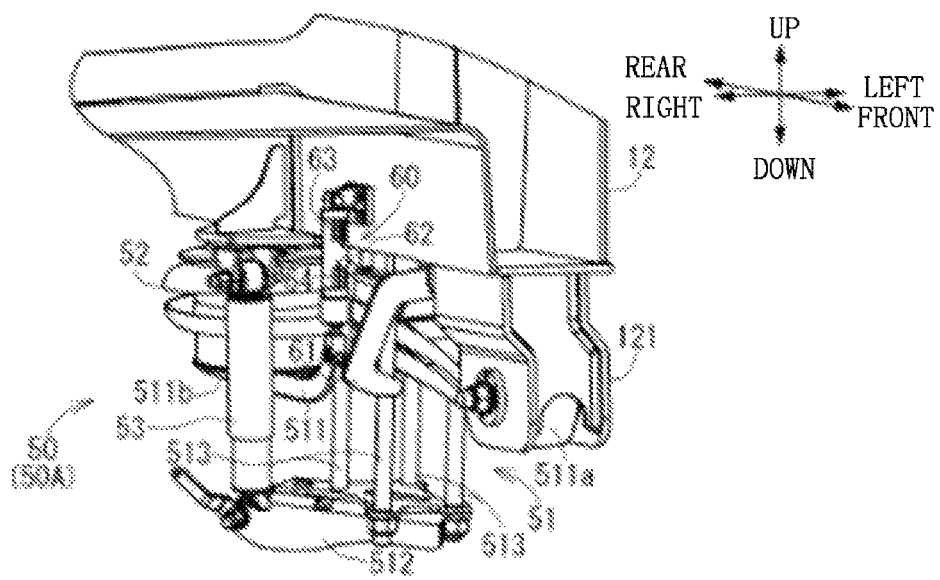
FIG. 6B is a perspective view illustrating the suspension device in which the air suspension is in the exhaust state and the locking member in the unlocked position.

The air suspension 52 is interposed between the front end 511b of the leaf spring 511 and the frame 12. The air suspension 52 is a spring member that extends when air is supplied and retracts when the air is exhausted, and adjusts the height of the vehicle body in the truck 10, as well as absorbs shocks caused by unevenness on the road while driving. The air suspension 52 is switchable between an exhaust state (illustrated in FIG. 5, FIG. 6A, and FIG. 6B), in which the air inside is exhausted and the air suspension retracts, and a leveling state (illustrated in FIG. 3, FIG. 4A, and FIG. 4B), in which air is supplied inside and the air suspension extends longer than in the exhaust state.

The air suspension 52 is switched to the leveling state, for example, when the truck 10 is traveling. The air suspension 52, which is switched to the leveling state, is supplied and exhausted with air according to the unevenness and other conditions on the road, and the amount of air supplied and exhausted is controlled so that the vehicle body of the truck 10 is at an appropriate height.

The air suspension 52 is switched to the exhaust state, for example, when the crane device 20 of the truck crane 1 is working. When the air suspension 52 is switched from the leveling state to the exhaust state, the leaf spring 511 of the shaft support unit 51 rotates around the rear end 511a to a side closer to the frame 12, thereby lowering the vehicle height of the truck 10. Conversely, when the air suspension 52 is switched from the exhaust state to the leveling state, the leaf spring 511 of the shaft support unit 51 rotates around the rear end 511a to a side away from the frame 12, thereby increasing the vehicle height of the truck 10.

The shock absorber 53 is interposed between the support plate 512 of the shaft support unit 51 and the frame 12. The shock absorber 53 can suppress excessive expansion and retraction movements expansion and retraction movement when absorbing the shocks of the air suspension 52.

[Locking Device]

As illustrated in FIGS. 4A, 4B, 6A, 6B and 8, the truck 10 includes a locking device 60. The locking devices 60 are provided at four locations corresponding to the plurality of suspension devices 50 provided on the left and right sides of the shafts 141 and 142. The locking device 60 includes a locking member 61, a locking cylinder 62, a full retraction sensor 63, and a full extension sensor 64.

Figure 8:
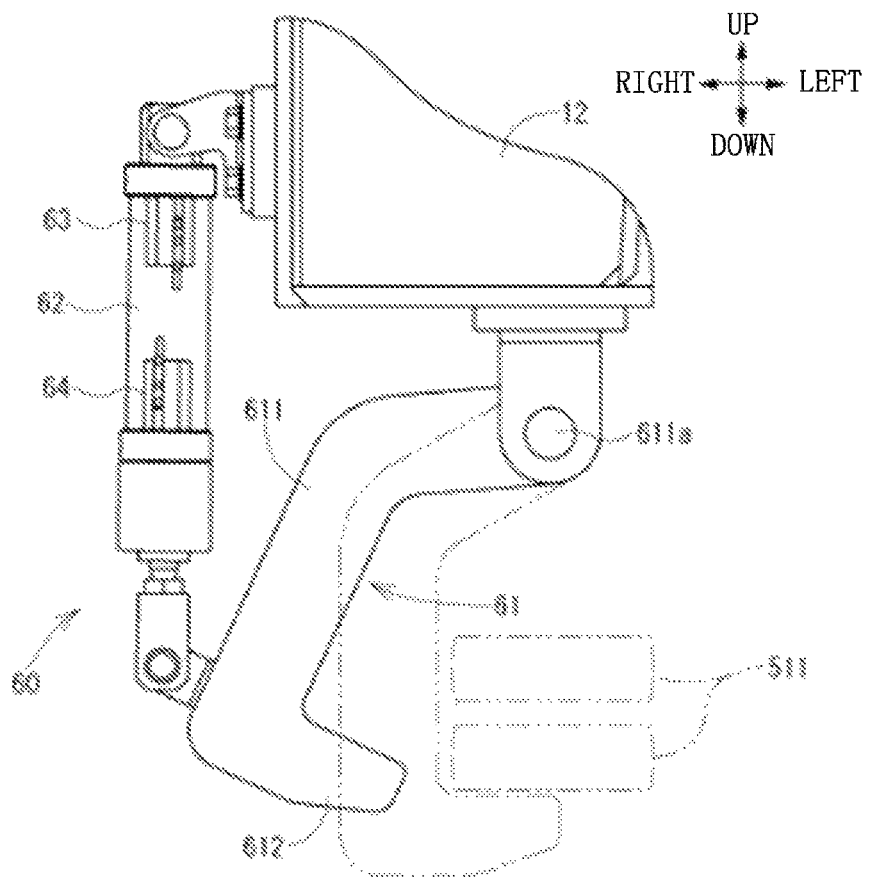
FIG. 8 is a front view illustrating the locking device.

As illustrated in FIG. 8, the locking member 61 includes a support unit 611 that is rotatably supported by the frame 12 and an engaging unit 612 that can be locked to the leaf spring 511 of the suspension device 50. The support unit 611 protrudes downward from a rotation fulcrum 611a that is rotatably supported by the frame 12, and the engaging unit 612 is bent from the lower end of the support unit 611 and protrudes in the horizontal direction.

The locking cylinder 62 is interposed between the frame 12 and the locking member 61, and projects in the vertical direction. The locking cylinder 62 is configured to be extendable and retractable.

Figure 7A:
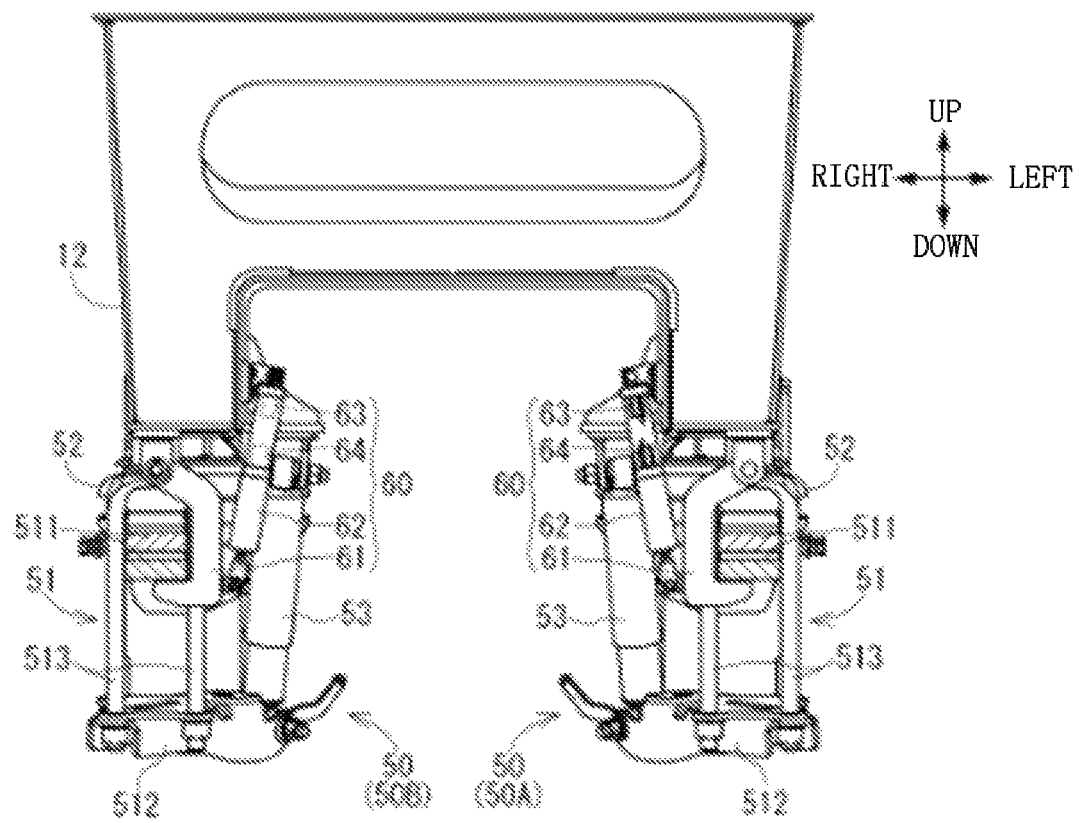
FIG. 7A is a front sectional view illustrating the suspension device in which the air suspension is in the exhaust state and the locking member is in the locked position.
Figure 7B:
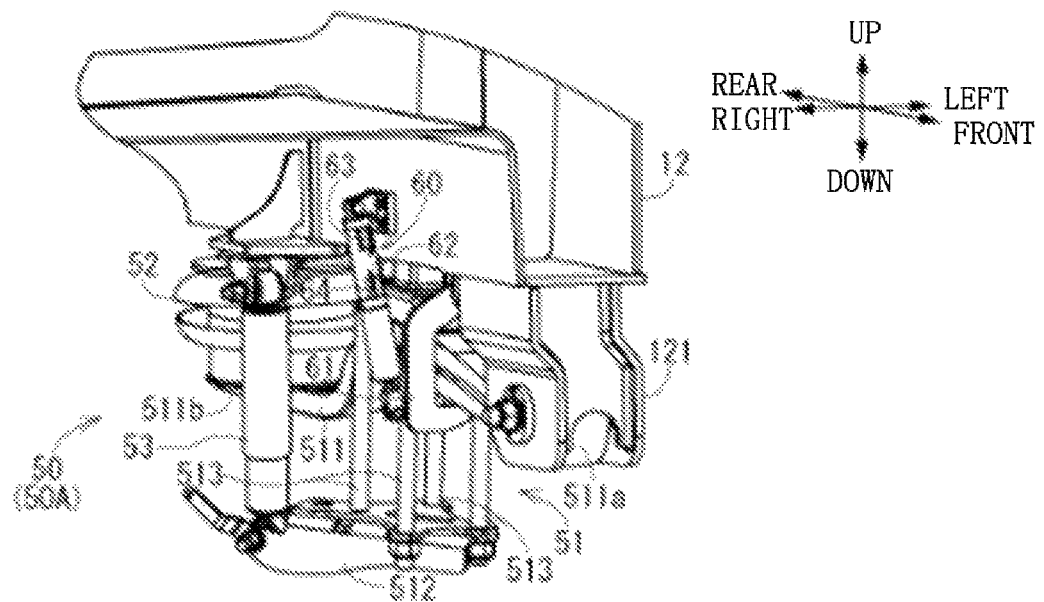
FIG. 7B is a perspective view illustrating the suspension device in which the air suspension is in the exhaust state and the locking member is in the locked position.

The locking cylinder 62 extend to rotate the locking member 61, and the engaging unit 612 of the locking member 61 moves to a side closer to the leaf spring 511. As illustrated in FIGS. 7A and 7B, when the air suspension 52 is in the exhaust position and the locking cylinder 62 has reached the fully extended position, which is the most extended position, the engaging unit 612, which has moved to the side closer to the leaf spring 511, engages with the leaf spring 511.

When the engaging unit 612 and the leaf spring 511 are in the engaged state, the rotation action of the leaf spring 511 away from the frame 12 is restricted by the locking member 61, and the extension action of the air suspension 52 in the exhaust state is restricted. The position of the locking member 61 in which the locking cylinder 62 moves to the fully extended position and the engaging unit 612 and the leaf spring 511 are engaged is the locked position (the position illustrated by two dotted lines in FIG. 8). That is, when the locking member 61 is in the locked position, the locking member 61 restricts the extension action of the air suspension 52 in the exhaust state.

As the locking cylinder 62 performs the retractation action, the locking member 61 rotates, and the engaging unit 612 of the locking member 61 moves in a direction away from the leaf spring 511. As illustrated in FIGS. 4A, 4B, 6A, and 6B, when the locking cylinder 62 reaches the fully retracted position, which is the most retracted position, the engaging unit 612, which has moved away from the leaf spring 511, is separated from the leaf spring 511.

When the engaging unit 612 is in a separated state from the leaf spring 511, the rotation action of the leaf spring 511 around the rear end 511a is not restricted by the locking member 61, and the extension action of the air suspension 52 in the exhaust state is allowed. The position of the locking member 61 in which the locking cylinder 62 moves to the fully retracted position and the engaging unit 612 is separated from the leaf spring 511 is the unlocked position (the position illustrated by two dotted lines in FIG. 8). That is, when the locking member 61 is in the unlocked position, the locking member 61 allows the extension action of the air suspension 52 in the exhaust state.

In this way, the locking cylinder 62 moves the locking member 61 between the locked position and the unlocked position by extension and retraction of the locking cylinder 62. Furthermore, the locking member 61 moves to the locked position when the locking cylinder 62 extends, and moves to the unlocked position when the locking cylinder 62 retracts.

The full retraction sensor 63 is fixed to the upper end of the locking cylinder 62, and detects that the locking cylinder 62 retracts and moved to the fully retracted position. The full extension sensor 64 is fixed below the full retraction sensor 63 of the locking cylinder 62, and detects that the locking cylinder 62 extends and moved to the fully extended position. In this case, a magnet is fixed to the piston of the locking cylinder 62, and for example, as illustrated in FIG. 8, when the piston moves upward and the locking cylinder 62 reaches the fully retracted position, the magnet of the piston approaches the full retraction sensor 63, and the full retraction sensor 63 detects the magnet, thereby detecting the fully retracted position of the locking cylinder 62. Also, when the piston moves downward and the locking cylinder 62 reaches the fully extended position, the magnet of the piston approaches the full extension sensor 64, and the full extension sensor 64 detects the magnet, thereby detecting the fully extended position of the locking cylinder 62.

When the locking cylinder 62 moves to the fully extended position, since the locking member 61 moves to the locked position, the full extension sensor 64 detects the fully extended position of the locking cylinder 62, thereby making it possible to detect that the locking member 61 has moved to the locked position. Also, when the locking cylinder 62 moves to the fully retracted position, since the locking member 61 moves to the unlocked position, the full retraction sensor 63 detects the fully retracted position of the locking cylinder 62, thereby making it possible to detect that the locking member 61 has moved to the unlocked position.

In this way, the full extension sensor 64 is a detection means that detects the extension of the locking cylinder 62 and also detects the locked position of the locking member 61, and the full retraction sensor 63 is a detection means that detects the retraction of the locking cylinder 62 and also detects the unlocked position of the locking member 61.

Note that, the present embodiment has a configuration in which the locking member 61 moves to the locked position when the locking cylinder 62 extends, and moves to the unlocked position when the locking cylinder 62 retracts, and also has an a configuration in which the locking member 61 moves to the locked position when the locking cylinder 62 retracts, and moves to the unlocked position when the locking cylinder 62 extends.

In this case, the full extension sensor 64 serves as a detection means that detects the extension of the locking cylinder 62 and detects the unlocked position of the locking member 61, and the full retraction sensor 63 serves as a detection means that detects the retraction of the locking cylinder 62 and detects the locked position of the locking member 61.

[Control Unit]

Figure 9:
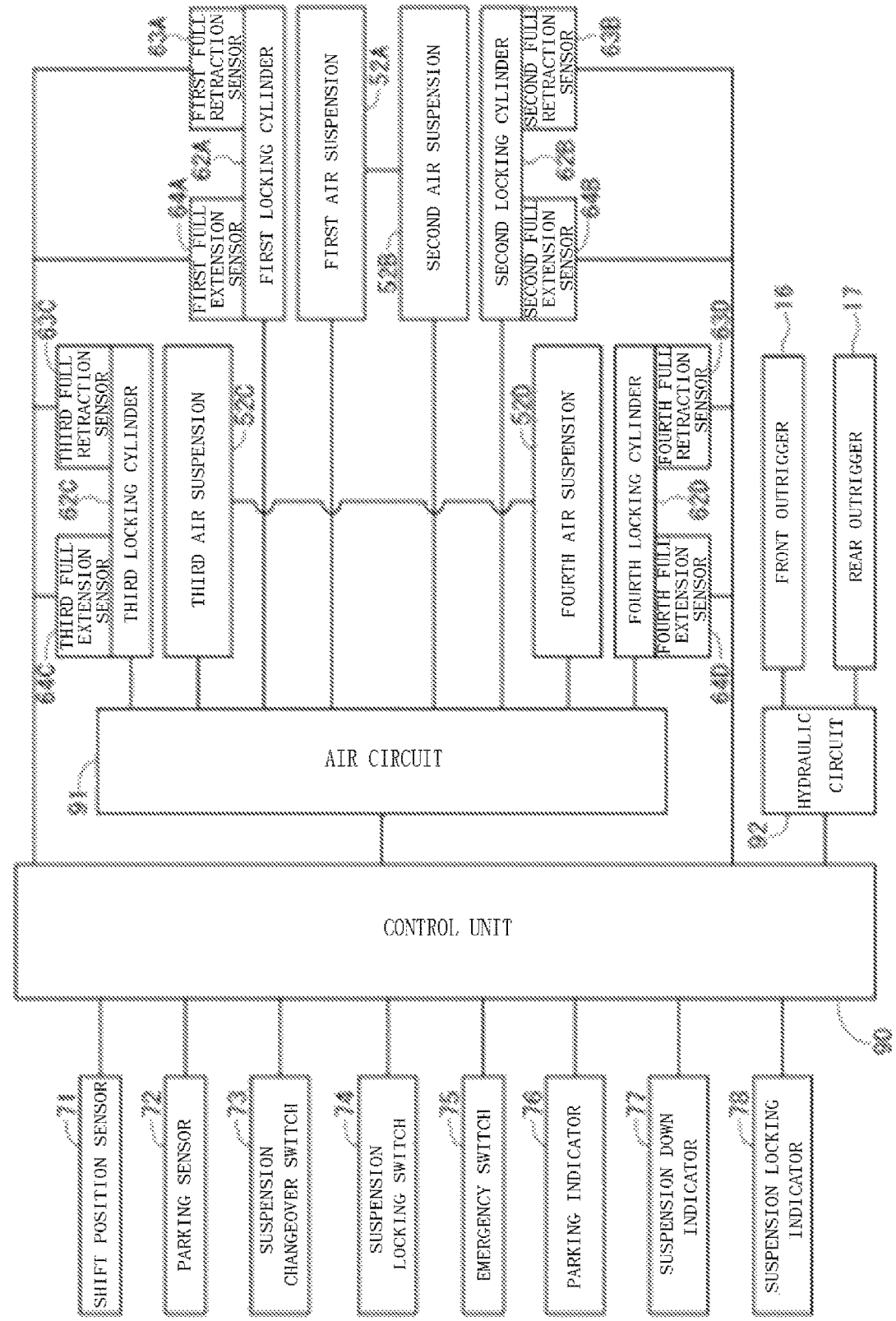
FIG. 9 is a block diagram of the truck crane regarding preparation for operation of an outrigger device before crane work.

As illustrated in FIG. 9, the truck crane 1 includes an air circuit 91 that drives the air suspension 52 and the locking cylinder 62, and a hydraulic circuit 92 that drives the front outriggers 16 and rear outriggers 17. The truck crane 1 also includes a control unit 90 that controls the actions of at least the air suspension 52, the locking cylinder 62, and the front outriggers 16 and the rear outriggers 17. The control unit 90 controls the actions of the air suspension 52 and the locking cylinder 62 by controlling the air circuit 91. Further, the control unit 90 controls the actions of the front outriggers 16 and the rear outriggers 17 by controlling the hydraulic circuit 92.

In the following description, the air suspension 52, the locking cylinder 62, the full retraction sensor 63, and the full extension sensor 64 provided in the suspension device 50A are referred to as a first air suspension 52A, a first locking cylinder 62A, a first full retraction sensor 63A, and a first full extension sensor 64A, respectively, and the air suspension 52, the locking cylinder 62, the full retraction sensor 63, and the full extension sensor 64 provided in the suspension device 50B are referred to as a second air suspension 52B, a second locking cylinder 62B, a second full retraction sensor 63B, and a second full extension sensor 64B, respectively, as necessary.

The air suspension 52, the locking cylinder 62, the full retraction sensor 63, and the full extension sensor 64 provided in the suspension device 50C are referred to as a third air suspension 52C, a third locking cylinder 62C, a third full retraction sensor 63C, and a third full extension sensor 64C, respectively, and the air suspension 52, the locking cylinder 62, the full retraction sensor 63, and the full extension sensor 64 provided in the suspension device 50D are referred to as a fourth air suspension 52D, a fourth locking cylinder 62D, a fourth full retraction sensor 63D, and a fourth full extension sensor 64D, respectively, as necessary.

The control unit 90 is connected to an air valve and the like that constitute the air circuit 91. The air circuit 91 is connected to the first air suspension 52A, the second air suspension 52B, the third air suspension 52C, the fourth air suspension 52D, the first locking cylinder 62A, the second locking cylinder 62B, the third locking cylinder 62C, and the fourth locking cylinder 62D.

The first air suspension 52A and the second air suspension 52B, and the third air suspension 52C and the fourth air suspension 52D are connected so that the supplied air can be communicated with each other, and the height of the vehicle body in the truck 10 can be adjusted accordingly by communicating air to each other.

The control unit 90 is connected to the first full retraction sensor 63A, the first full extension sensor 64A, the second full retraction sensor 63B, the second full extension sensor 64B, the third full retraction sensor 63C, the third full extension sensor 64C, and the fourth full extension sensor 63D, and a fourth full extension sensor 64D. The control unit 90 is connected to a hydraulic valve and the like that constitutes the hydraulic circuit 92. The hydraulic circuit 92 is connected to the front outriggers 16 and the rear outriggers 17.

The truck crane 1 has a shift position sensor 71 that detects that the shift lever position of the truck 10 is in the neutral position (N position), a parking sensor 72 that detects that the parking lever of the truck 10 is in the activated position of the parking brake, a suspension changeover switch 73 for switching the air suspension 52 between the leveling state and the exhaust state, a suspension locking switch 74 for switching the locking member 61 between the locked position and the unlocked position, and an emergency switch 75 to be operated in the event of a malfunction or the like of the full retraction sensor 63 and the full extension sensor 64.

The shift position sensor 71, the parking sensor 72, the suspension changeover switch 73, the suspension locking switch 74, and the emergency switch 75 are connected to the control unit 90, the detection results of the shift position sensor 71 and the parking sensor 72, as well as the operation status of the suspension changeover switch 73, the suspension locking switch 74, and the emergency switch 75, can be input to the control unit 90.

The truck crane 1 also has a parking indicator 76 that lights when the parking brake is activated, a suspension down indicator 77 that lights when the air suspension 52 is in the exhaust state, and a suspension locking indicator 78 that lights when the locking member 61 is in the locked position.

The parking indicator 76, the suspension down indicator 77, and the suspension locking indicator 78 are connected to the control unit 90, and the control unit 90 can control the lighting, flashing, and turning off of the parking indicator 76, the suspension down indicator 77, and the suspension locking indicator 78.

The suspension changeover switch 73, the suspension locking switch 74, the emergency switch 75, the parking indicator 76, the suspension down indicator 77, and the suspension locking indicator 78 are arranged in the driver cab 11, for example.

[Control of Suspension Device, Locking Device, and Outrigger Device by Control Unit]

Next, control of the suspension device 50, the locking device 60, and the front outriggers 16 and the rear outriggers 17, which are outrigger devices, by the control unit 90 will be described.

(Control in Preparation for Operation of Outrigger Device Before Crane Work)

In the truck crane 1, before performing crane work using the crane device 20, the front outriggers 16 and the rear outriggers 17 are operated to move from the housing position to the ground contact position. In this case, the control unit 90 performs control on the suspension device 50, the locking device 60, and the front outriggers 16 and the rear outriggers 17 in preparation for operation of the outrigger device, the control being that the air suspension 52 is switched from the leveling state to the exhaust state, and the movement of the front outriggers 16 and the rear outriggers 17 to the ground contact position is restricted until the air suspension 52, which has been switched to the exhaust state, is locked by the locking member 61. Preparation for operation of the outrigger device before crane work is performed as follows.

Figure 10:
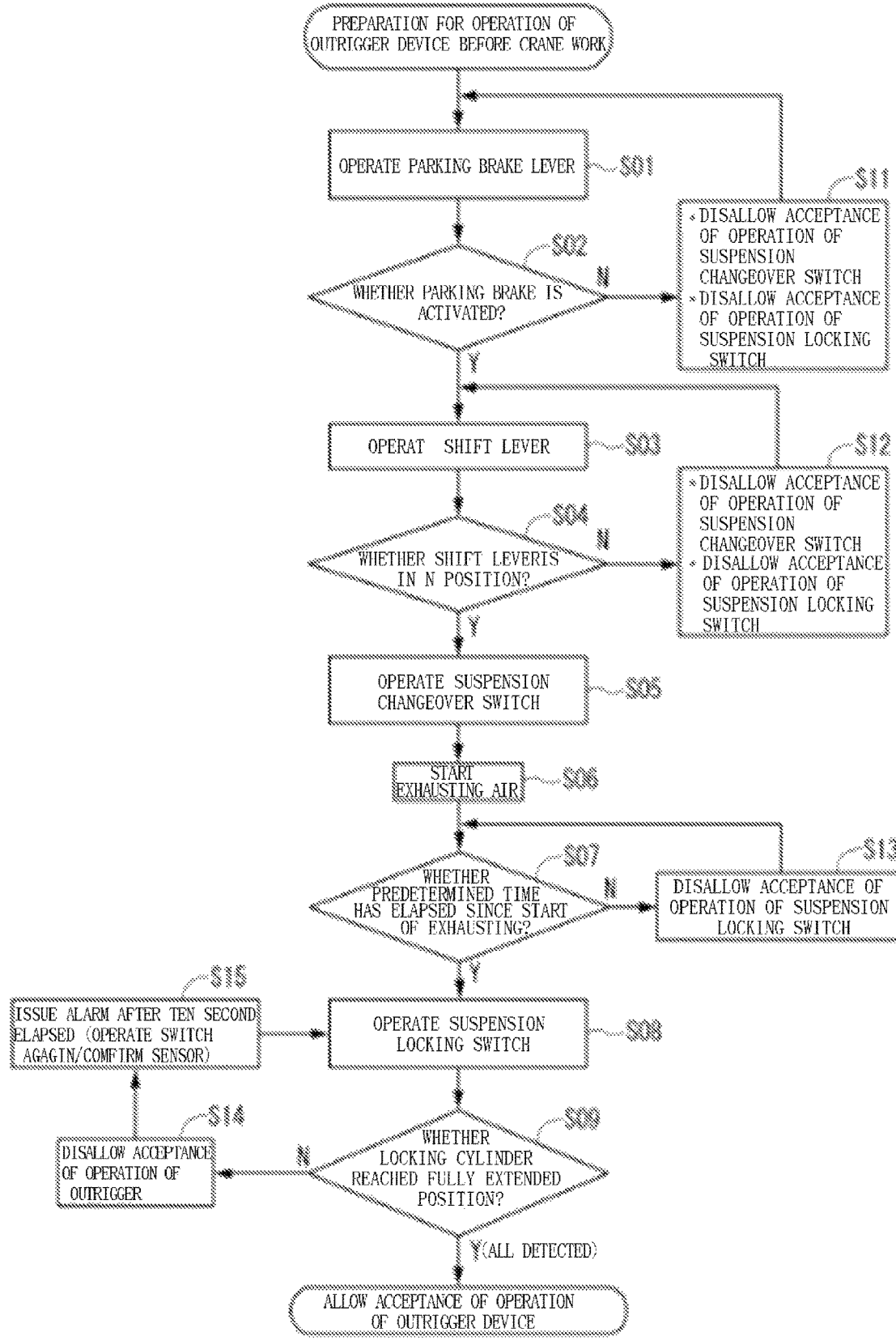
FIG. 10 is a diagram illustrating a flow of control by a control unit regarding preparation for operation of the outrigger device before crane work.
Figure 11A:
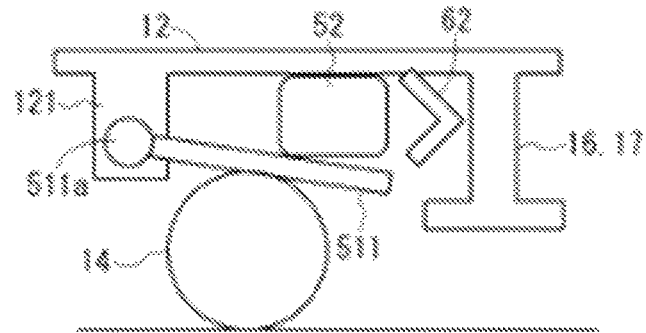
FIGS. 11A, 11B, 11C and 11D are diagrams illustrating the movement of the suspension device when preparing the outrigger device for operation before crane work.

First, the user of the truck crane 1 stops the truck crane 1 which is in a travelling state. As illustrated in FIG. 11A, in a stopped state of a traveling truck crane 1, the air suspension 52 is in the leveling state, the locking member 61 is in an unlocked position, the locking cylinder 62 is in the fully retracted position, the full extension sensor 64 does not detect the fully extended position of the locking cylinder 62, and the front outriggers 16 and the rear outriggers 17 are in the housing position. Furthermore, the parking indicator 76, the suspension down indicator 77, and the suspension locking indicator 78 are turned off. As illustrated in FIG. 10, after stopping the truck crane 1, the user of the truck crane 1 operates the parking lever to activate the parking brake (step S01).

The control unit 90 determines whether the parking brake is activated when the preparation for operation of the outrigger device is started (step S02). When the control unit 90 determines in step S02 that the parking brake is not activated (step S02; N), the control unit 90 disallows the acceptance of the operation of the suspension changeover switch 73 that switches the air suspension 52 between the leveling state and the exhaust state, and disallows the acceptance of the operation of the suspension locking switch 74 that switches the locking member 61 between the locked position and the unlocked position (step S11). The control unit 90 repeatedly executes step S02 until the control unit 90 determines that the parking brake is activated.

When the parking lever is operated by the user of the truck crane 1 and the parking brake is activated, the parking sensor 72 detects that the parking brake is activated, and the detection result of the parking sensor 72 is input to the control unit 90.

When the control unit 90 receives the detection result of the parking sensor 72 indicating that the parking brake is activated, the control unit 90 determines in step S02 that the parking brake is activated (step S02; Y). After the control unit 90 determines in step S02 that the parking brake is activated, the control unit 90 lights up the parking indicator 76.

After the user of the truck crane 1 operates the parking lever, the user of the truck crane 1 operates the shift lever of the truck 10 to the neutral position (N position) (step S03).

After the control unit 90 determines that the parking brake is activated, the control unit 90 determines whether the shift lever of the truck 10 is in the neutral position (N position) (step S04). When the control unit 90 determines in step S04 that the shift lever of the truck 10 is not in the neutral position (step S04; N), the control unit 90 disallows the acceptance of the operation of the suspension changeover switch 73 that switches the air suspension 52 between the leveling state and the exhaust state and disallows the acceptance of the operation of the suspension locking switch 74 that switches the locking member 61 between the locked position and the unlocked position (step S12). The control unit 90 repeatedly executes step S04 until control unit 90 determines that the shift lever of the truck 10 is in the neutral position.

When the shift lever is operated to the neutral position by the user of the truck crane 1, the shift position sensor 71 detects that the shift lever is in the neutral position, and the detection result of the shift position sensor 71 is input to the control unit 90.

When the control unit 90 receives the detection result of the shift position sensor 71 indicating that the shift lever is in the neutral position, the control unit 90 determines in step S04 that the shift lever of the truck 10 is in the neutral position (step S04; Y). After the control unit 90 determines that the shift lever of the truck 10 is in the neutral position, the control unit 90 allows the operation of the suspension changeover switch 73 to be accepted.

The user of the truck crane 1 operates the parking lever to confirm that the parking indicator 76 lights up, operates the shift lever of the truck 10 to the neutral position, and then operates the suspension changeover switch 73 to the side where the air suspension 52 is in the exhaust state (step S05). When the suspension changeover switch 73 is operated, the control unit 90 controls the air circuit 91 to start exhausting the air supplied to the air suspension 52 (step S06).

After the control unit 90 starts exhausting the air suspension 52, the control unit 90 determines whether a predetermined time has elapsed since the start of exhausting (step S07). When the control unit 90 determines in step S07 that the predetermined time has not elapsed (step S07; N), the control unit 90 disallows the acceptance of the operation of the suspension locking switch 74 that switches the locking member 61 between the locked position and the unlocked position (step S13). The control unit 90 repeatedly executes step S07 until control unit 90 determines that the predetermined time has elapsed. Note that in the present embodiment, the predetermined time elapsed since the start of exhausting is set to 15 seconds.

The air suspension 52 is configured so that all the air is exhausted and the air suspension 52 is switched to the exhaust state until the predetermined time has elapsed since the suspension changeover switch 73 is operated.

Figure 11B:
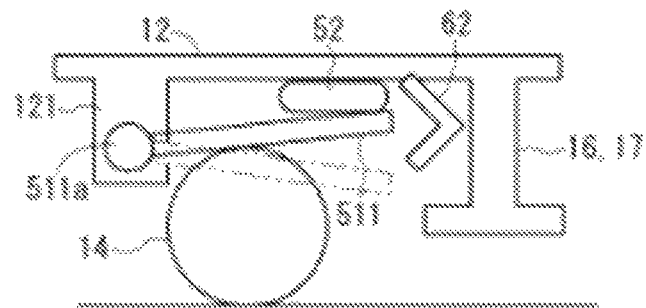

As illustrated in FIG. 11B, when the air suspension 52 starts to exhaust, the air suspension 52 retracts and the leaf spring 511 of the shaft support unit 51 rotates toward a side closer to the frame 12, thereby lowering the vehicle height of the truck 10.

When the control unit 90 determines in step S07 that the predetermined time has elapsed since the start of exhausting (step S07; Y), the control unit 90 lights the suspension down indicator 77 to allow the operation of the suspension locking switch 74 to be accepted. In this case, the suspension down indicator 77 may be flashing from the time the suspension changeover switch 73 is operated until it is determined that the predetermined time has elapsed.

After the predetermined time has elapsed since the start of exhausting, the control unit 90 disallows the acceptance of the movement operation of the front outriggers 16 and the rear outriggers 17 from the housing position to the ground contact position. In other words, the control unit 90 restricts the movement of the front outriggers 16 and the rear outriggers 17 to the ground contact position in the state where the air suspension 52 is in the exhaust state and the full extension sensor 64 does not detect the fully extended position of the locking cylinder 62 and the locked position of the locking member 61.

When the user of the truck crane 1 confirms that the suspension down indicator 77 lights up, the user operates the suspension locking switch 74 to the side where the locking member 61 moves to the locked position (step S08). When the suspension locking switch 74 is operated, the control unit 90 controls the air circuit 91 to extend the locking cylinder 62 and move the locking member 61 from the unlocked position to the locked position. After the suspension locking switch 74 is operated, the control unit 90 determines whether or not the extended locking cylinder 62 has reached the fully extended position (step S09).

When the suspension locking switch 74 is operated by the user of the truck crane 1 and the locking cylinder 62 extends and moves to the fully extended position, the full extension sensor 64 detects that the locking cylinder 62 has moved to the fully extended position, and the detection result of the full extension sensor 64 is input to the control unit 90.

When the control unit 90 receives the detection result of the full extension sensor 64 indicating that the locking cylinder 62 has moved to the fully extended position, the control unit 90 determines in step S09 that the locking cylinder 62 has moved to the fully extended position (step S09; Y). Since the locking member 61 moves to the locked position when the locking cylinder 62 moves to the fully extended position, the control unit 90 determines that the movement of the locking member 61 to the locked position is detected when the detection result of the full extension sensor 64 indicating that the locking cylinder 62 has moved to the fully extended position is input.

Thus, the control unit 90 determines that the movement of the locking member 61 to the locked position is detected when the full extension sensor 64 detects the movement of the locking cylinder 62 to the fully extended position due to extension, making it easy and reliable to grasp that the locking member 61 is in the locked position.

Figure 11C:
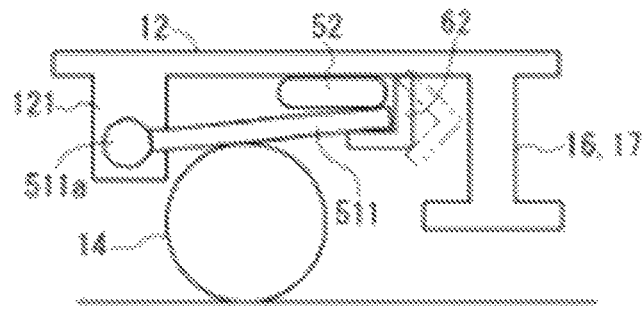

As illustrated in FIG. 11C, when the locking cylinder 62 extends and moves to the fully extended position, the locking member 61 moves to the locked position, the engaging unit 612 of the locking member 61 and the leaf spring 511 are engaged, and the extension action of the air suspension 52 in the exhaust state is restricted.

When the control unit 90 determines that the first locking cylinder 62A, the second locking cylinder 62B, the third locking cylinder 62C, and the fourth locking cylinder 62D, which are arranged in four locations, have all moved to the fully extended position, the control unit 90 determines that the extension action of all air suspension 52 in the suspension devices 50A, 50B, 50C, and 50D is restricted, and lights up the suspension locking indicator 78 and allows the movement operation of the front outriggers 16 and the rear outriggers 17 from the housing position to the ground contact position to be accepted.

In other words, the control unit 90 allows the movement of the front outriggers 16 and the rear outriggers 17 to the ground contact position in a state where the air suspension 52 is in the exhaust state and the full extension sensor 64 detects the fully extended position of the locking cylinder 62 and the locked position of the locking member 61.

In particular, the control unit 90 lights up the suspension locking indicator 78 and allows the movement of the front outriggers 16 and the rear outriggers 17 to the ground contact position in a state where the first full extension sensor 64A, the second full extension sensor 64B, the third full extension sensor 64C, and the fourth full extension sensor 64D all detect the locked position of the locking member 61. In this case, the suspension locking indicator may be flashing from the time the suspension locking switch 74 is operated to the side where the locking member 61 moves to the locked position until all of the full extension sensors 64 detect the locked position of the locking member 61.

The control unit 90 disallows the acceptance of the operation of the suspension changeover switch 73 during the period when the suspension locking indicator 78 is lit. In other words, the control unit 90 restricts the switch action of the air suspension 52 from the exhaust state to the leveling state in a state where the air suspension 52 is in the exhaust state and the full extension sensor 64 detects the locked position of the locking member 61.

The control unit 90 allows the movement operation of the front outriggers 16 and the rear outriggers 17 to be accepted, thereby preparing the operation of the outrigger devices.

When the user of the truck crane 1 confirms that the suspension locking indicator 78 lights up, the user activates the PTO shaft of the engine 15 and the hydraulic pump of the hydraulic circuit 92 to move the front outriggers 16 and the rear outriggers 17 from the housing position to the ground contact position. The movement of the front outriggers 16 and the rear outriggers 17 from the housing position to the ground contact position can be performed, for example, by operation outside the driver cab 11 and cabin 21, or inside the cabin 21.

Figure 11D:
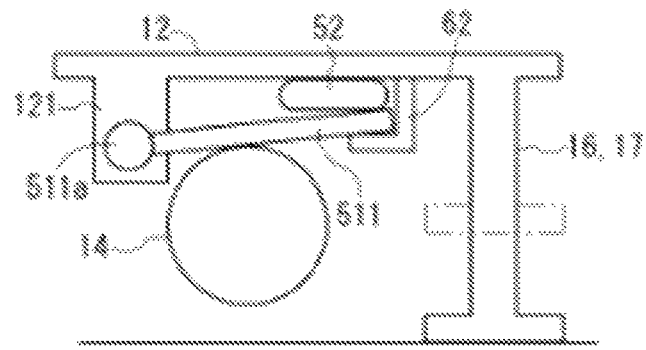

As illustrated in FIG. 11*d*, when the front outriggers 16 and the rear outriggers 17 move from the housing position to the ground contact position, the front outriggers 16 and the rear outriggers 17 contact the ground, the vehicle body of the truck 10 rises, and the front wheels 13 and the rear wheels 14 leave the ground.

On the other hand, during the period until the control unit 90 determines in step S09 that the first locking cylinder 62A, the second locking cylinder 62B, the third locking cylinder 62C, and the fourth locking cylinder 62D have all moved to the fully extended position, that is, in a case where at least one of the first locking cylinder 62A, the second locking cylinder 62B, the third locking cylinder 62C, and the fourth locking cylinder 62D are not moved to the fully extended position (step S09; N), the control unit 90 disallows the acceptance of the movement operation of the front outriggers 16 and the rear outriggers 17 (step S14).

When sufficient time has elapsed after the operation of the suspension locking switch 74 for the locking cylinder 62 to move to the fully extended position, but the control unit 90 has not determined that all of the locking cylinders 62 have moved to the fully extended position, the control unit 90 issues an alarm and urge the user of the truck crane 1 to operate the suspension locking switch 74 again and/or confirm the activation status of the full extension sensor 64 (step S15). Note that in the present embodiment, the time between the operation of the suspension locking switch 74 and the alarm being issued is set to 10 seconds.

Thus, in preparation for operation of the outrigger device, the control unit 90 restricts the movement of the front outriggers 16 and the rear outriggers 17 to the ground contact position in a state where the air suspension 52 is in the exhaust state and the full extension sensor 64 does not detect the locked position of the locking member 61, and allows the movement of the front outriggers 16 and rear outriggers 17 to the ground contact position in a state where the air suspension 52 is in the exhaust state and the full extension sensor 64 detects the locked position of the locking member 61.

In a state where the front outriggers 16 and the rear outrigger 17 move to the ground contact position and the rear wheels 14 are separated from the ground, the air suspension 52 interposed between the shaft support unit 51 and the frame 12 is subjected to an unsprung load including the weight of the shaft support unit 51, the shafts 141 and 142, and the rear wheels 14. Therefore, when the front outriggers 16 and the rear outriggers 17 move to the ground contact position in a state where the extension action of the air suspension 52 is not restricted by the locking member 61, the air suspension 52 in the exhaust state may extend at once due to the unsprung load, and may be damaged or deteriorated.

In the truck crane 1, however, the movement of the front outriggers 16 and the rear outriggers 17 to the ground contact position is allowed when the air suspension 52 is in the exhaust state and the locking member 61 is in the locked position. Therefore, even when the front outriggers 16 and the rear outriggers 17 move to the ground contact position when the air suspension 52 is in the exhaust state, the extension action of the air suspension 52 is restricted by the locking member 61, and the air suspension 52 can be suppressed from being damaged or deteriorated by extending at once due to the unsprung load.

In particular, since the control unit 90 allows the movement of the front outriggers 16 and the rear outriggers 17 from the housing position to the ground contact position in a state where all full extension sensors 64 detect the locked position of the locking member 61, in a case where the air suspension 52 is in the exhaust state, and the front outriggers 16 and the rear outriggers 17 are moved to the ground contact position, all the air suspensions 52 can be suppressed from being damaged or deteriorated.

In the present embodiment, since the locking member 61 moves to the locked position when the locking cylinder 62 extends, the control unit 90 determines that the movement of the locking member 61 to the locked position is detected when the movement of the locking cylinder 62 to the fully extended position due to extension is detected, and in a case of a configuration in which the locking member 61 moves to the locked position when the locking cylinder 62 retracts, the control unit 90 can determine that the movement of the locking member 61 to the locked position is detected when the movement of the locking cylinder 62 to the fully retracted position due to retraction is detected.

(Control after Completion of Crane Work)

In the truck crane 1, after crane work by the crane device 20 is completed, the front outriggers 16 and the rear outriggers 17 are operated to move from the ground contact position to the housing position, and the air suspension 52 is switched from the exhaust state to the leveling state, so that the truck crane 1 is set to the travelling state.

In a case where the truck crane 1 is set to the travelling state after crane work by the crane device 20 is completed, the control unit 90 performs the reverse control from the preparation for operation of the outrigger device as described above.

Figure 12A:
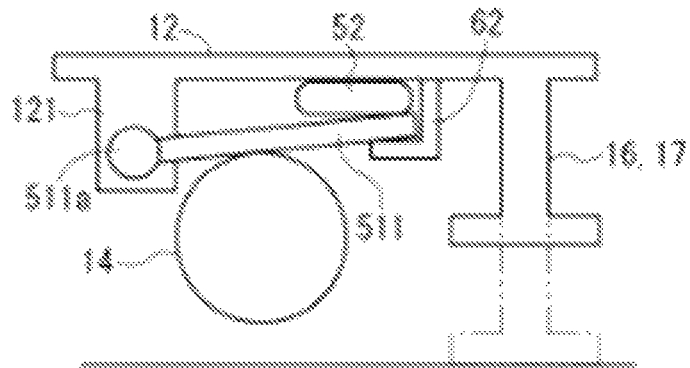
FIGS. 12A, 12B, and 12C are diagrams illustrating the movement of the suspension device when setting the truck crane to a traveling state after completion of crane work.

Specifically, after the user of the truck crane 1 confirms that the suspension down indicator 77 and suspension locking indicator 78 are lit, the crane work by the crane device 20 is completed, and as illustrated in FIG. 12A, the front outriggers 16 and the rear outriggers 17 are operated to move from the housing position to the ground contact position, and the PTO shaft of the engine 15 is turned off. The movement of the front outriggers 16 and the rear outriggers 17 from the ground contact position to the housing position can be done, for example, by an operation outside the driver cab 11 and the cabin 21, or by an operation inside the cabin 21.

Figure 12B:
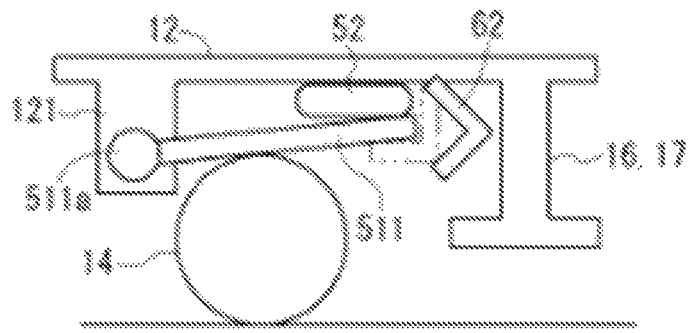

Next, after the user of the truck crane 1 confirms that the suspension down indicator 77 and suspension locking indicator 78 are lit, the user operates the suspension locking switch 74 to the side where the locking member 61 moves to the unlocked position. As illustrated in FIG. 12B, when the suspension locking switch 74 is operated, the locking member 61 moves from the locked position to the unlocked position, allowing the air suspension 52 to extend.

In this case, the control unit 90 determines that the movement of the locking member 61 from the locked position to the unlocked position is detected when the full retraction sensor 63 detects the movement of the locking cylinder 62 to the fully retracted position by retraction. Thus, when the control unit 90 determines that the movement of the locking member 61 to the unlocked position is detected when the full retraction sensor 63 detects the movement of the locking cylinder 62 to the fully retracted position by retraction, it is easy and reliable to grasp that the locking member 61 is in the unlocked position.

The control unit 90 turns off the suspension locking indicator 78 when the first full retraction sensor 63A, the second full retraction sensor 63B, the third full retraction sensor 63C, and the fourth full retraction sensor 63D all detect the unlocked position of the locking member 61. The control unit 90 allows the operation of the suspension changeover switch 73 to be accepted when the suspension locking indicator 78 is turned off. In this case, the suspension locking indicator 78 may be flashing from the time the suspension locking switch 74 is operated to the side where the locking member 61 moves to the unlocked position until all of the full retraction sensors 63 detect the unlocked position of the locking member 61.

In other words, in a state where the air suspension 52 is in the exhaust state and the full extension sensor 64 detects the locked position of the locking member 61, the control unit 90 restricts the switching action of the air suspension 52 from the exhaust state to the leveling state, and the control unit 90 allows the switch action of the air suspension 52 from the exhaust state to the leveling state when the full retraction sensor 63 detects the unlocked position of the locking member 61.

In particular, in a state where at least one of the first full retraction sensor 63A, the second full retraction sensor 63B, the third full retraction sensor 63C, and the fourth full retraction sensor 63D detects the locked position of the locking member 61, the control unit 90 restricts the switch action of the air suspension 52 from the exhaust state to the leveling state, and the control unit 90 allows the switch action of the air suspension 52 from the exhaust state to the leveling state when all of the full retraction sensors 63 detect the unlocked position of the locking member 61.

Figure 12C:
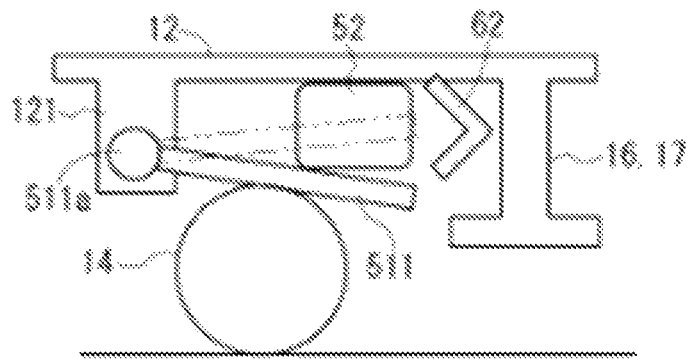

After the user of the truck crane 1 confirms that the suspension locking indicator 78 is turned off, the user operates the suspension changeover switch 73 to the side where the air suspension 52 is in the leveling state. As illustrated in FIG. 12C, when the suspension changeover switch 73 is operated, the air suspension 52 extends, and the leaf spring 511 of the shaft support unit 51 rotates to a side away from the frame 12, thereby increasing the vehicle height of the truck 10. When the air suspension 52 is in the leveling state, the suspension down indicator 77 turns off. In this case, the suspension down indicator 77 may be turned off after the control unit 90 determines that a predetermined time has elapsed since the suspension changeover switch 73 is operated to the side where the air suspension 52 is in the leveling state. The suspension down indicator 77 may be flashing from the time the suspension changeover switch 73 is operated to the side where the air suspension 52 is in the leveling state until the suspension down indicator 77 turns off.

After the user of the truck crane 1 confirms that the suspension down indicator 77 and the suspension locking indicator 78 are turned off, the user operates the parking lever to turn off the parking brake and operates the shift lever of the truck 10 to the drive position to start driving the truck crane 1. The parking indicator 76 turns off when the parking brake is turned off.

Thus, in a state where the air suspension 52 is in the exhaust state and the full extension sensor 64 detects the locked position of the locking member 61, the control unit 90 restricts the switching action of the air suspension 52 from the exhaust state to the leveling state. Since the locking member 61 is engaged with the leaf spring 511 when the locking member 61 is in the locked position, when the air suspension 52 extends and switches to the leveling state in a state where the locking member 61 is in the locked position, the locking member 61 may be deformed by the pressing force from the air suspension 52 and may be damaged or deteriorated.

However, in a state where the air suspension 52 is in the exhaust state and the full extension sensor 64 detects the locked position of the locking member 61, since the control unit 90 restricts the switch action of the air suspension 52 to the leveling state, in a state where the air suspension 52 is in the exhaust state and the locking member 61 is in the locked position, the control unit 90 can suppress the air suspension 52 from extending from the exhaust state which may damage or deteriorate the locking member 61.

In particular, in a state where the air suspension 52 is in the exhaust state and at least one of the first full retraction sensor 63A, the second full retraction sensor 63B, the third full retraction sensor 63C, and the fourth full retraction sensor 63D detects the locked position of the locking member 61, since the control unit 90 restricts the switch action of the air suspension 52 from the exhaust state to the leveling state, in a state where the air suspension 52 is in the exhaust state and at least one of the locking member 61 is in the locked position, the control unit 90 can suppress the locking member 61 from being damaged or deteriorated.

In the present embodiment, since the locking member 61 moves to the unlocked position when the locking cylinder 62 retracts, the control unit 90 determines that the movement of the locking member 61 to the unlocked position is detected when the movement of the locking cylinder 62 to the fully retracted position due to retraction is detected, and in a case of a configuration in which the locking member 61 moves to the unlocked position when the locking cylinder 62 extends, the control unit 90 can determine that the movement of the locking member 61 to the unlocked position is detected when the movement of the locking cylinder 62 to the fully extended position due to extension is detected.

In a case where the control unit 90 is unable to properly control the suspension device 50, the locking device 60, and the front outriggers 16 and rear outriggers 17 due to a failure of the full extension sensor 64 and the full retraction sensor 63, or for any other reason, by operating emergency switch 75, the suspension device 50, the locking device 60, and the front outriggers 16 and the rear outriggers 17 can be operated regardless of the control of the control unit 90.

For example, a momentary switch can be used as the emergency switch 75. By using the momentary switch as the emergency switch 75, it is possible to configure in such a manner that the suspension device 50, the locking device 60, and the front outriggers 16 and the rear outriggers 17 can be operated only during the operation of the emergency switch 75, regardless of the control of the control unit 90.

When the shift lever of the truck 10 is in the neutral position, the parking brake is activated, and the suspension changeover switch 73 is operated to the side where the air suspension 52 is in the exhaust state, the control unit 90 can issue an alarm when an operation or other operation is performed to drive the truck crane 1, such as operating the parking lever to stop the activation of the parking brake.

When the truck crane 1 travels in a state where the suspension changeover switch 73 is operated and the air suspension 52 is in the exhaust state, the truck crane 1 may lose its center-of-gravity balance, causing the truck crane 1 to lean during traveling and braking and possibly causing damage to parts, and by issuing an alarm in this manner, the occurrence of leaning and damage to parts during traveling and braking can be suppressed.

REFERENCE SIGNS LIST

1 Truck crane
10 Truck
12 Frame
13 Front wheels
14 Rear wheels
16 Front outrigger
17 Rear outrigger
20 Crane device
50 Suspension device
51 Shaft support unit
52 Air suspension
60 Locking device
61 Locking member
62 Locking cylinder
63 Full retraction sensor
64 Full extension sensor
90 Control unit
131, 132 (front wheel) Shaft
141, 142 (rear wheel) Shaft

The invention claimed is:
1. A work vehicle comprising:
a shaft on which a wheel is rotatably mounted;
a suspension device that has a shaft support unit that supports the shaft, and an air suspension that is interposed between the shaft support unit and a vehicle body and is switchable between an exhaust state in which air inside is exhausted and the air suspension retracts, and a leveling state in which air is supplied inside and the air suspension extends longer than the exhaust state;
a locking member that is movable between a locked position that restricts an extension action of the air suspension in the exhaust state and an unlocked position that allows the extension action of the air suspension in the exhaust state;
an outrigger device that is movable between a ground contact position where the outrigger device contacts the ground and supports the vehicle body and a housing position where the outrigger device is housed in the vehicle body; and a control unit that includes at least one circuit that controls actions of at least the air suspension, the locking member, and the outrigger device, wherein the control unit restricts a movement of the outrigger device to a ground contact position in a state where the air suspension is in the exhaust state and the locking member is not in the locked position, and allows a movement of the outrigger device to the ground contact position in a state where the air suspension is in the exhaust state and the locking member is in the locked position.

2. The work vehicle according to claim 1, further comprising a sensor that detects the locked position and the unlocked position of the locking member.

3. The work vehicle according to claim 1, further comprising:

a plurality of the wheels;
a plurality of the suspension device provided corresponding to the plurality of the wheels; and
a plurality of the locking member provided corresponding to the plurality of the wheels, wherein
the control unit allows a movement of the outrigger device to the ground contact position in a state where all the locking members are in the locked position.

4. The work vehicle according to claim 1, wherein
the control unit restricts a switch action of the air suspension from the exhaust state to the leveling state in a state where the air suspension is in the exhaust state and the locking member is in the locked position.

5. The work vehicle according to claim 4, further comprising:

a plurality of the wheels;
a plurality of the suspension device provided corresponding to the plurality of the wheels; and
a plurality of the locking member provided corresponding to the plurality of the wheels, wherein
the control unit restricts a switch action of the air suspension from the exhaust state to the leveling state in a state where at least one of the locking member is in the locked position.

6. The work vehicle according to claim 1, further comprising:

a locking cylinder that extends and retracts to move the locking member between the locked position and the unlocked position; and
a sensor that detects an expansion and a retraction of the locking cylinder, wherein
the locking member moves to a locked position on one hand when the locking cylinder extends or retracted, and moves to an unlocked position on an other hand when the locking cylinder extends or retracted, and
the control unit determines that a movement of the locking member to the locked position is detected when the sensor detects one of an expansion and a retraction of the locking cylinder, and determines that a movement of the locking member to the unlocked position is detected when the sensor detects an other of an expansion or a retraction of the locking cylinder.

* * * * *